(12) United States Patent
Deshwal et al.

(10) Patent No.: US 9,058,377 B2
(45) Date of Patent: Jun. 16, 2015

(54) FIXED WIDTH ENCODING DOCUMENT POSTING LISTS

(75) Inventors: Priyendra Deshwal, Mountain View, CA (US); Srdjan Petrovic, Mountain View, CA (US); Asim Shankar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 675 days.

(21) Appl. No.: 13/153,264

(22) Filed: Jun. 3, 2011

(65) Prior Publication Data

US 2014/0067862 A1    Mar. 6, 2014

(51) Int. Cl.
*G06F 7/00* (2006.01)
*G06F 17/30* (2006.01)

(52) U.S. Cl.
CPC ................ *G06F 17/30657* (2013.01)

(58) Field of Classification Search
CPC .............. G06F 17/30; G06F 17/30657; G06F 17/30162
See application file for complete search history.

(56) References Cited

U.S. PATENT DOCUMENTS

| | | | |
|---|---|---|---|
| 8,166,041 B2* | 4/2012 | Merrigan et al. | 707/742 |
| 2009/0248725 A1* | 10/2009 | Bhattacharjee et al. | 707/101 |
| 2009/0313238 A1* | 12/2009 | Merrigan et al. | 707/5 |
| 2012/0275374 A1* | 11/2012 | Kalfon et al. | 370/328 |

* cited by examiner

*Primary Examiner* — Azam Cheema

(57) ABSTRACT

This specification describes technologies relating to fixed width encoding/decoding of document posting lists. In general, one aspect of the subject matter described in this specification can be embodied in apparatuses that include a server obtaining a list of one or more of document identification numbers, each of the document identification numbers uniquely identifying a document; an encoding device operatively connected to the server, the encoding device generating a sequence of deltas from the sequential list of one or more of the document identification numbers, and encoding each delta in the sequence of deltas using a fixed-width encoding scheme.

15 Claims, 7 Drawing Sheets

FIXED WIDTH ENCODING DOCUMENT POSTING LISTS

TECHNICAL FIELD

The technical field relates to methods and apparatuses for encoding posting lists stored in search engine indices.

BACKGROUND

With a vast of ever-increasing information available electronically, a search engine is typically utilized by a user to locate desired pieces of information. For example, a user may perform a keyword search where the user inputs one or more keywords to a search engine, which returns back to the user a search result set containing documents that include at least one or all of the inputted keywords. In addition to be able to generate better search results (i.e., information better matched to what the user is looking for), a search engine must also satisfy the expectation of the user to receive and explore the search results quickly. Typically, search results are encoded for the purposes of speed and saving memory space. However, search engines have faced a common problem in dealing with a tradeoff between time and space when implementing an encoding scheme. On one hand, a simplified encoding scheme usually allows a quicker decoding process, but requires more memory space. On the other hand, a more complex encoding scheme typically has a slower decoding process but consumes less memory space.

SUMMARY

Implementations of the subject matter described in this specification may include an apparatus comprising: a server obtaining a sequential list of one or more of document identification numbers, each of the document identification numbers uniquely identifying a document; and an encoding device operatively connected to said server, said encoding device generating a sequence of deltas from the sequential list of one or more of the document identification numbers, for each delta in the sequence of deltas, determining if the each delta is greater than or equal to a first maximum value of a first predetermined byte number, and for each of the deltas greater than or equal to the first maximum value, recalculating the deltas as one or more multiples of the first maximum value and a remainder value, said encoding device determining a first total number of bytes for encoding the sequence of deltas based on the first predetermined byte number.

In other aspects of the subject matter described in this specification, the encoding device, for the each delta in the sequence of deltas, determines if the each delta is greater than or equal to a second maximum value of a second predetermined byte number, and for each of the deltas greater than or equal to the second maximum value, recalculates, the deltas as one or more multiples of the second maximum value and a remainder value, said encoding device determining a second total number of bytes for encoding the sequence of deltas based on the second predetermine byte number.

In other aspects of the subject matter described in this specification, the encoding device compares the first total number of bytes and the second total number of bytes, and encodes the sequence of deltas using a first predetermined byte number if the first total number of bytes is smaller than the second total number of bytes and encodes the sequence of deltas using the second predetermined byte number if the first total number of bytes is greater than or equal to the second total number of bytes.

In other aspects of the subject matter described in this specification, said server receives a search request and one or more keywords, said server obtaining the sequential list of one or more of the document identification numbers based on the received search request and one or more keywords.

In other aspects of the subject matter described in this specification, the first predetermined byte number is 1 and the second predetermined byte number is 2.

Other implementations of the subject matter described in this specification may include a computer-implemented method for encoding, comprising: obtaining a sequential list of one or more of the document identification numbers; generating a sequence of deltas based on the sequential list of one or more of the document identification numbers; for each delta in the sequence of deltas, determining if the each delta is greater than or equal to a first maximum value of a first predetermined byte number, and for each of the deltas greater than or equal to the first maximum value, recalculating the deltas as one or more multiples of the first maximum value and a remainder value; and determining a first total number of bytes for encoding the sequence of deltas based on the first predetermined byte number.

In other aspects of the subject matter described in this specification, the method further comprising: for the each delta in the sequence of deltas, determining the each delta is greater than or equal to a second maximum value of a second predetermined byte number, for each of the deltas greater than or equal to the second maximum value, recalculating the deltas as one or more multiples of the second maximum value and a remainder value; and determining a second total number of bytes for encoding the sequence of deltas based on the second predetermined byte number.

In other aspects of the subject matter described in this specification, the method further comprising: comparing the first total number of bytes and the second total number of bytes; encoding the sequence of deltas using a first predetermined byte number if the first total number of bytes is smaller than the second total number of bytes; and encoding the sequence of deltas using the second predetermined byte number if the first total number of bytes is greater than or equal to the second total number of bytes.

In other aspects of the subject matter described in this specification, the method further comprising: receiving a search request and one or more keywords, and obtaining the sequential list of one or more of the document identification numbers based on the received search request and one or more keywords.

In other aspects of the subject matter described in this specification, the first predetermined byte number is 1 and the second predetermined byte number is 2.

Other implementations of the subject matter described in this specification may include a computer-readable medium having computer-executable instructions, which, when executed by a computer having one or more processors, cause the computer to perform steps of: obtaining a sequential list of one or more of the document identification numbers; generating a sequence of deltas based on the sequential list of one or more of the document identification numbers; for each delta in the sequence of deltas, determining if the each delta is greater than or equal to a first maximum value of a first predetermined byte number, and for each of the deltas greater than or equal to the first maximum value, recalculating the deltas as one or more multiples of the first maximum value and a remainder value; and determining a first total number of bytes for encoding the sequence of deltas based on the first predetermined byte number.

In other aspects of the subject matter described in this specification, said computer-executable instructions, which, when executed by the computer, cause the computer to perform additional step of: for the each delta in the sequence of deltas: determining if the each delta is greater than or equal to a second maximum value of a second predetermined byte number, for each of the deltas greater than or equal to the second maximum value, recalculating the deltas as one or more multiples of the second maximum value and a remainder value if the each delta is greater than or equal to the second maximum value; and determining a second total number of bytes for encoding the sequence of deltas based on the second predetermine byte number.

In other aspects of the subject matter described in this specification, said computer-executable instructions, which, when executed by the computer, cause the computer to perform additional step of: comparing the first total number of bytes and the second total number of bytes; encoding the sequence of deltas using a first predetermined byte number if the first total number of bytes is smaller than the second total number of bytes; and encoding the sequence of deltas using the second predetermined byte number if the first total number of bytes is greater than or equal to the second total number of bytes.

In other aspects of the subject matter described in this specification, said computer-executable instructions, which, when executed by the computer, cause the computer to perform additional step of: receiving a search request and one or more keywords, and obtaining the sequential list of one or more of the document identification numbers based on the received search request and one or more keywords.

In other aspects of the subject matter described in this specification, the first predetermined byte number is 1 and the second predetermined byte number is 2.

Other implementations of the subject matter described in this specification may include an apparatus comprising: a memory storing an encoded list to be decoded; and a decoding device operatively connected to said memory, said decoding device receiving a document identification number; obtaining the encoded list to be decided; extracting from the encoded list a predetermined byte number used to encode each of sequential numbers in the encoded list; and calculating a sum of one or more of the sequential numbers in the encoded list, said calculated sum is not smaller than the document identification number.

In other aspects of the subject matter described in this specification, the sum is calculated by: reading out sequentially and adding the sequential numbers in the encoded list to the sum until the sum is not smaller than the document identification number.

In other aspects of the subject matter described in this specification, the sum is calculated by: when the sum is not smaller than the document identification number, determining if a last read-out sequential number in the encoded list is equal to a maximum value of the predetermined byte number, reading out and adding a next sequential number in the encoded list to the sum.

Other implementations of the subject matter described in this specification may include a computer-implemented method for decoding, comprising: receiving a document identification number; obtaining the encoded list to be decided; extracting from the encoded list a predetermined byte number used to encode each of sequential numbers in the encoded list; and calculating a sum of one or more of the sequential numbers in the encoded list, said calculated sum is not smaller than the document identification number.

In other aspects of the subject matter described in this specification, the method further comprising: reading out sequentially and adding the sequential numbers in the encoded list to the sum until the sum is not smaller than the document identification number.

In other aspects of the subject matter described in this specification, the method further comprising: when the sum is not smaller than the document identification number, determining if a last read-out sequential number in the encoded list is equal to a maximum value of the predetermined byte number, reading out and adding a next sequential number in the encoded list to the sum.

Other implementations of the subject matter described in this specification may include a computer-readable medium having computer-executable instructions, which, when executed by a computer having one or more processors, cause the computer to perform steps of: receiving a document identification number; obtaining the encoded list to be decided; extracting from the encoded list a predetermined byte number used to encode each of sequential numbers in the encoded list; and calculating a sum of one or more of the sequential numbers in the encoded list, said calculated sum is not smaller than the document identification number.

In other aspects of the subject matter described in this specification, said computer-executable instructions, which, when executed by the computer, cause the computer to perform additional step of: reading out sequentially and adding the sequential numbers in the encoded list to the sum until the sum is not smaller than the document identification number.

In other aspects of the subject matter described in this specification, said computer-executable instructions, which, when executed by the computer, cause the computer to perform additional step of: when the sum is not smaller than the document identification number, determining if a last read-out sequential number in the encoded list is equal to a maximum value of the predetermined byte number, reading out and adding a next sequential number in the encoded list to the sum.

Further scope of applicability of the present invention will become apparent from the detailed description given hereinafter. However, it should be understood that the detailed description and specific examples, while indicating preferred embodiments of the subject matter described in this specification, are given by way of illustration only, since various changes and modifications within the spirit and scope of the subject matter described in this specification will become apparent to those skilled in the art from this detailed description.

BRIEF DESCRIPTION OF DRAWINGS

The present invention will become more fully understood from the detailed description given herein below and the accompanying drawings which are given by way of illustration only, and thus are not limitative of the present invention. Like reference numbers and designations in the various drawings indicate like elements.

DETAILED DESCRIPTION

The present disclosure provides an efficient fixed width encoding scheme for a sequence of numbers, such as a sequence of document identification numbers. Typically, a search engine assigns document identification numbers to uniquely identify documents that are available to be searched. When a search engine builds an index, a sequence of document identification numbers is compiled as a posting list. For the benefit of saving memory space, the sequence of document identification numbers is encoded. The efficient encoding and decoding of posting lists may lead to significant performance gains for a search engine. In addition, efficient encoding and decoding require less resource consumption. As a result there may be less overhead cost for running a search engine.

As will be discussed in detail below, by utilizing a fixed width encoding scheme, the decoder can be very efficient. For example, the decoder may make use of a packed sum of absolute differences ("psadbw") streaming SIMD extensions 2 ("SSE2") instruction to decode up to 16 one-byte values in 2-5 cycles.

Figure 1:
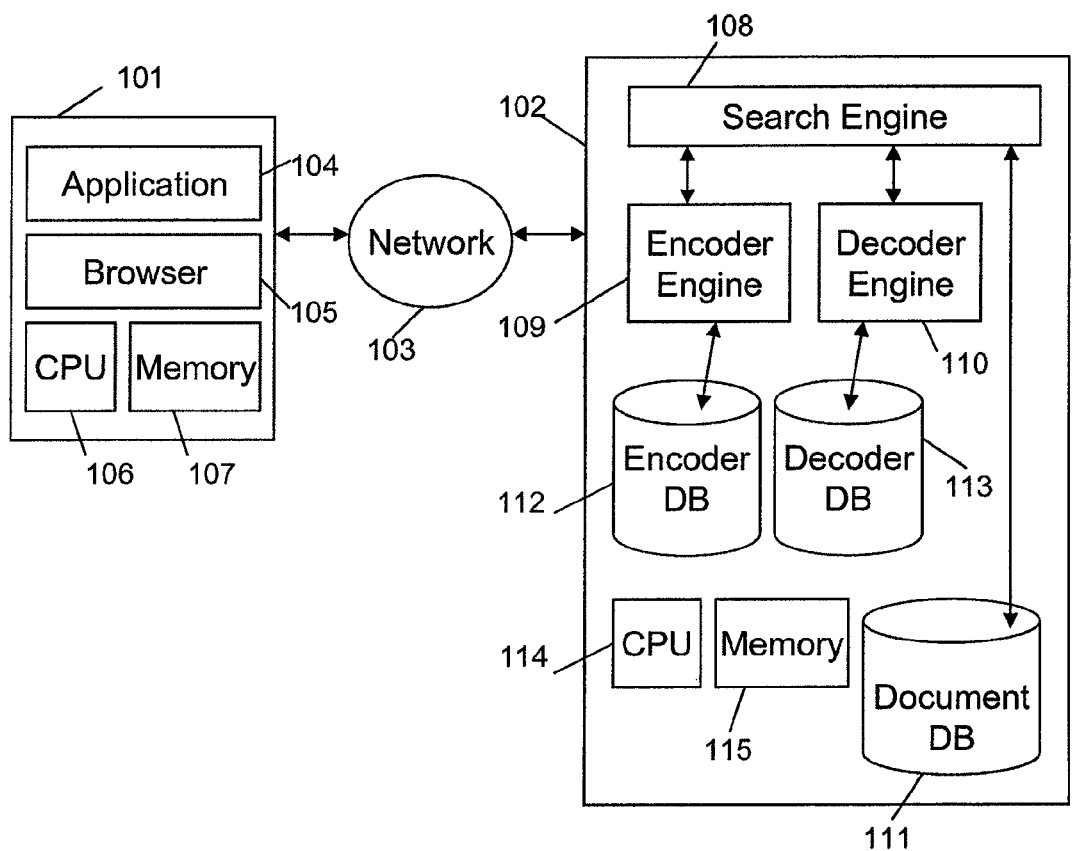
FIG. 1 is a block diagram illustrating an overall system for implementing fixed width encoding of a document posting list according to some embodiments.

FIG. 1 is a block diagram illustrating an overall system 100 in which a user terminal device 101 transmits a search request to, and receives a search result from, a search engine server 102 via a network 103, which may be the Internet, a cellular network, a wired network, wireless or other conventional network technology. It is to be understood that, in practice, there will be plural and likely a very large number of user terminal devices 101 (only one is shown). Also, the search engine server 102 may be a unitary device but would be preferably be implemented as a server farm or a distributed computing system in order to handle simultaneous connections with many user terminal devices 101.

The user terminal device 101 may include components such as one or more applications 104, one or more browsers 105, one or more processors (CPUs) 106, and one or more memories 107. Examples of the user terminal device 101 include such known devices as desktop computers, portable computers, mobile devices, tablets, etc. Conventional components such as displays, speakers, microphones, connectors, and input devices may also be included in the user terminal device 101 as is well known.

It is to be understood that the CPU and memory devices (e.g. such as the CPU 106 and memory 107 for the user terminal device 101 and/or the CPU 113 and memory 114 for the search engine server 102) may be arranged as dedicated units each programmed with the functionalities described herein for the various functional units or may be hardware resources that are shared among multiple functional units. The hardware design choice for such arrangements is governed by routine engineering principles such as size, weight, cost, etc based on components available at the time of implementation. Moreover, the inventive techniques and aspects described herein, although shown in block diagram form, may be implemented using a combination of hardware, firmware and/or software as is known in the art.

The search engine server 102 may include a search engine 108, an encoder engine 109, a decoder engine 110, a document database 111, an encoder database 112, a decoder database 113, one or more processors (CPUs) 114, and one or more memory devices 115.

The search engine 108, the encoder engine 109, the decoder engine 110, the document database 111, the encoder database 112, and/or the decoder database 113 may be part of the search engine server 102 as illustrated, or independent components in communication with the search engine server 102.

The search engine 108 and the document database 111 may be implemented to generate a search result based on a received search request from the user terminal device 101 via the network 103. For example, the search engine 108 may receive a search query including one or more keywords from the user terminal device 101, and perform a search using the document database 111 to generate a search result. The document database 111 may include any type of documents, such as web pages, electronic files, etc., each of which is identified by an unique document identification number (not shown).

The encoder engine 109 and the encoder database 112 may be implemented to perform an encoding process according to some embodiments. For instance, while building the search index, the encoder engine 109 may receive a list of search results from the search engine 108, perform an encoding process to encode the list of document identification numbers of those search results, and store the encoded posting list in the encoder database 112.

The decoder engine 110 and the decoder database 113 may be implemented to perform a decoding process according to some embodiments. For instance, the decoder engine 110 may receive an encoded posting list from the search engine 109, perform a decoding process to obtain the list of stored document identification numbers, and store that list in the decoder database 113.

As will be further described below, the search engine 108, the document database 111, the encoder database 112, and the decoder database 113 may be considered optional components. In such a case, the search server 102 may receive a search result directly from other servers (not shown) to be encoded or decoded by the encoder engine 109 or the decoder engine 110. The encoded or decoded search result may be transmitted to one or more of the other servers or the user terminal device 101 without storing the encoded/decoded search result in the encoder database 112 or the decoder database 113.

Figure 2:
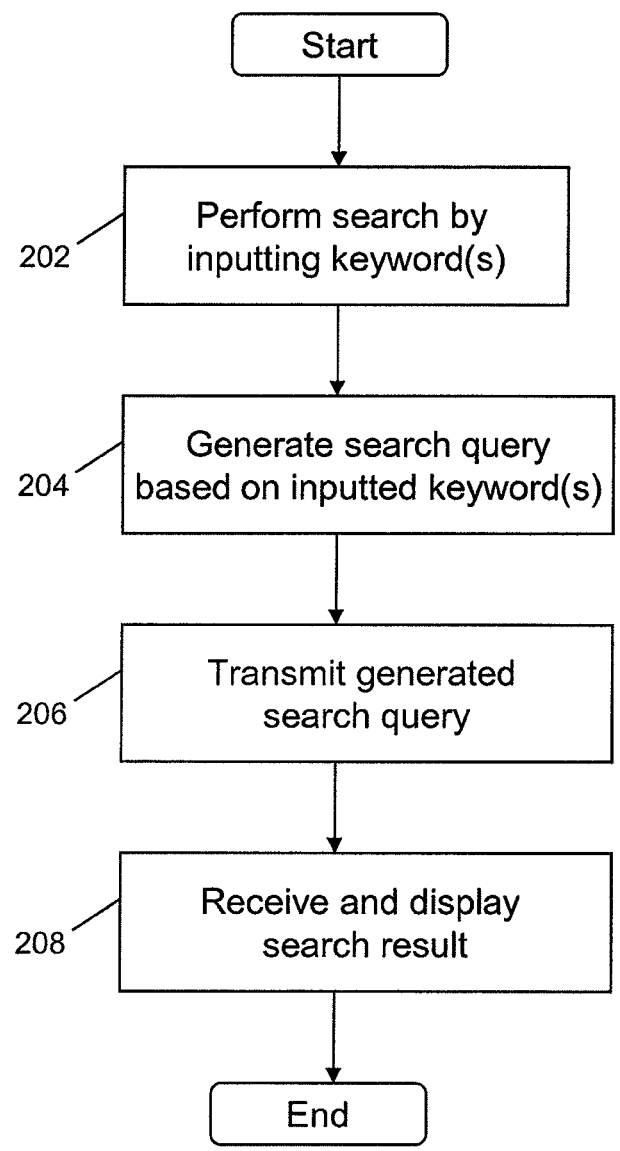
FIG. 2 is a flow diagram illustrating a process for transmitting a search request and receiving a search result by a user terminal according to some embodiments.

FIG. 2 illustrates a flow diagram for a process 200 of performing a search and receiving a search result by a user terminal according to some embodiments. The process 200 may be implemented by the application 104 or the browser 105 in FIG. 1.

At step 202, a user invokes an application 104 installed on the user terminal 101 or launches a browser 105 to perform a search. In some embodiments, the user may use an input device (not shown) on the user terminal 101 to input one or more keywords to the application 104 or the browser 105.

At step 204, the user terminal 101 generates a search query based on the inputted one or more keywords.

The generated search query is transmitted to a search engine server 102 via the network 103 at step 206.

At step 208, depending on the processing result of the search engine server 102, the user terminal 101 receives, as a search result, a list of documents. Also, the list of documents is displayed on the user terminal 101. In some embodiments, the list of documents is displayed using by the application 104 or the browser 105. The specifics of how the list of documents is displayed are outside the primary scope of concepts of the present invention, and thus, will not be discussed further in detail.

Figure 3:
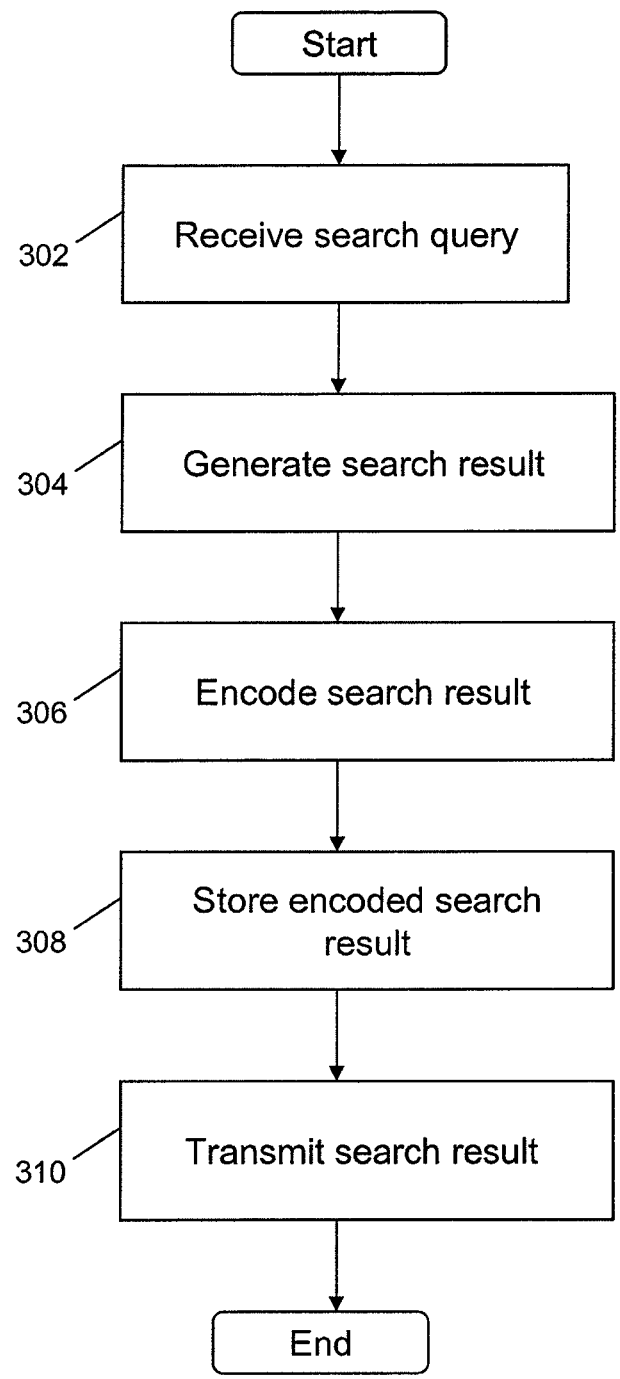
FIG. 3 is flow diagram illustrating a process for receiving a search request and providing a search result by a server according to some embodiments.

FIG. 3 illustrates a flow diagram for an exemplary process 300 of receiving a search query and providing a search result by the search engine server 102.

At step 302, the search engine server 102 receives from a user terminal device 101 a search query containing one or more keywords.

At step 304, the search engine 108 generates, as a search result, a list of document identification numbers, using the received search query. Each of the document identification numbers uniquely identifies a document responsive to the search query. In some embodiments, the search engine 108 generates the search result by performing a search in the document database 111 to obtain the list of document identification numbers. In such embodiments, the document identification numbers are previously assigned to documents stored in the document database 111. While the process to generate the search result is described as being performed by the search engine 108, in some embodiments, the process may be performed by other server(s) (not shown) in communication with the search engine server 102.

At step 306, the list of document identification numbers (search result) is encoded by the encoding engine 109, which will be explained in detail below.

The encoded list of document identification numbers is stored in the encoder database 112 at step 308.

At step 310, the search engine server 102 transmits the search result to the user terminal device 101 via the network 103.

The specifics of the process to generate a search result (step 304) and to transmit the search to the user terminal device 101 (step 308) are outside the primary scope of concepts of the present invention, and thus, will not be discussed further in detail.

Figure 4:
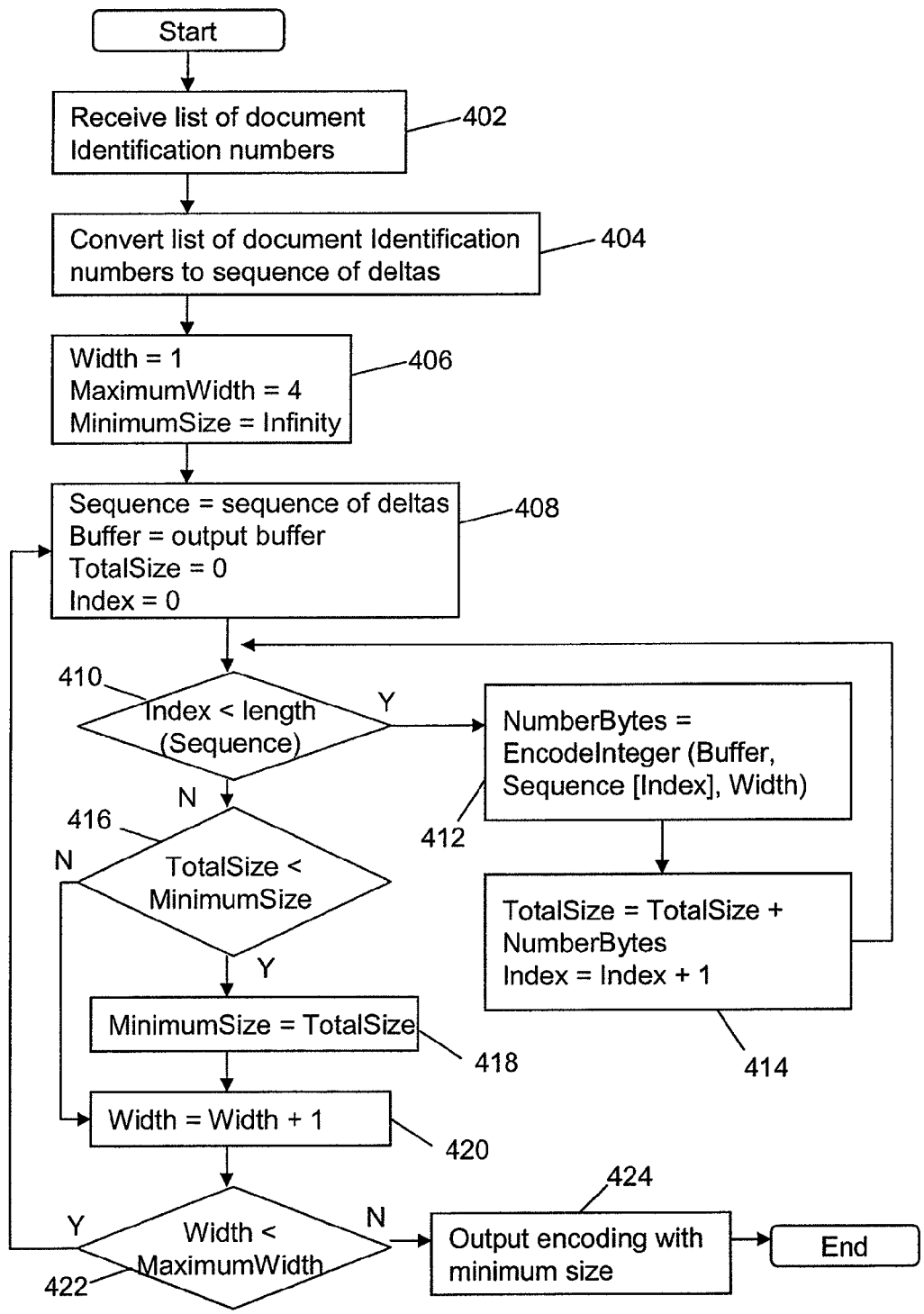
FIG. 4 is a flow diagram illustrating processes for an encoder according to some embodiments.

FIG. 4 illustrates a flow diagram for an exemplary process 400 for implementing the encoding at step 306 in FIG. 3. The encoder engine 109, in some embodiments, implements the process 400 utilizing the encoder database 112.

At step 402, the encoder engine 109 receives a list of document identification numbers (a posting list) from the search engine 108 or other servers (not shown) in communication with the search engine server 102.

At step 404, the encoder engine 109 converts the received list of document identification numbers into a sequence of deltas. Specifically, each document identification number on the list is replaced with the difference from the previous document identification number on the list. For example, supposed that the encoder engine 109 receives a list of document identification numbers (0, 20, 100, 500, 600, 1000, 1010, 1500). The encoder engine 109 converts that list into a sequence of deltas (0, 20, 80, 400, 100, 400, 10, 490). By converting the list into a sequence of deltas, the magnitudes of the numbers become smaller and require less memory space.

Given this sequence of deltas, one way to encode it is to determine how many bytes are needed to encode each delta individually. For example, a value under 256 can be encoded in one byte, and a value between 256 and 65535 can be encoded in two bytes, and so on. Such an encoding scheme is based on a variable length encoding scheme. While each delta uses only as many bytes as is strictly required and no bytes are wasted, because each delta has a variable number of bytes, an indicator needs to be stored for each delta to indicate the number of bytes used.

The above example describes a typical variable length encoding scheme, which may encode the sequence of deltas as the following:

((1, 0) (1, 20), (1, 80), (2, 400), (1, 100), (2, 400), (1, 10), (2, 490))

In the above, each pair of numbers has a first number indicating the number of bytes used and a second number as the delta. As such, a variable length encoding scheme requires many instructions to decode since the number of bytes used needs to be looked up first, and only then can a delta be decoded. On the other hand, utilizing a fixed width encoding scheme, which will be described in detail below, provides better decoding efficiency.

The deltas of a typical posting list may have a predictable distribution. For example, if a common word like "the", which occurs in almost all documents, is used as a keyword to generate the posting list, the deltas for the list will be very small (i.e., less than 256). However, for uncommon words like "antidisestablishmentarianism," the deltas are usually very large. In other words, by analyzing the distribution of deltas for a list of document identification numbers, a fixed number of bytes can be predetermined for encoding all the deltas in the list of document identification numbers. As such, for a list of document identification numbers generated based on common words, the fixed number of bytes is predetermined to be small, such as one byte. For a list of document identification numbers generated based on uncommon words, the fixed number of bytes is predetermined to be higher, depending upon uncommonness of the word.

If the number of bytes used to encode each delta in a given posting list is known, there is no need of additional CPU cycles to look up the number of bytes used for each delta when decoding the encoded posting list.

Furthermore, for a fixed width encoding, a fixed byte number needs to be predetermined for the posting list to make sure the deltas in the posting list are properly encoded. One way would be to choose a number of bytes required to encode the maximum delta in the posting list. However, such approach would likely end up using more memory space than necessary since a single statistical outlier delta which is very large can cause all the other relatively small deltas to be encoded in a large number of bytes.

Another way is to choose a fixed number of bytes which is big enough for most of deltas. While this approach may provide better space efficiency, there is a need of a solution to handle overflow deltas without compromising the fundamental benefit of this approach (which is that all deltas are encoded in a fixed width).

It is noted that an encoded posting list is often decoded in order to assess a particular element in the list. Furthermore, because the posting list is delta encoded, assessing a particular element involves a summation of all the deltas between a current position and the position of the particular element. On this basis, if an element has a value greater than a fixed number of bytes, any overflow deltas can be separated into multiple parts such that each of the parts can be encoded in the fixed number of bytes. As such, the sum of the multiple parts is the overflow delta of the element. For example, if one byte is used as the fixed number of bytes, the maximum value is 255. A delta of 400, which is greater than 255, can be separated into 255 and 145. As a result, each of 255 and 145 can be encoded in one byte. In view of the above observations, a fixed encoding according to some embodiments is described in reference to steps 406 to 422.

At step 406, three parameters, Width, MaximumWidth, and MinimumSize, are initialized to predetermined values. "Width" represents a byte number used and "Maximum- Width" represents a maximum byte number utilized for the encoding process 400. For example, when Width equals 1, the encoding processing utilizes 1-byte encoding, when Width equals 2, the encoding process utilizes 2-byte encoding, and so on to the maximum-number-byte (MaximumWidth) encoding. "MinimumSize" represents the minimal number of bytes used to encode a sequence of deltas. In the exemplary process 400 illustrated in FIG. 4, Width is set to one, MaximumWidth is set to four and MinimumSize is set to infinity. However, it should be understood that each of Width and MaximumWidth may be set to any number greater than or equal to one, and MaximumWidth is greater than or equal to Width. As will be explained later, by utilizing parameters Width and MaximumWidth, the process 400 performs 1-byte (Width), 2-byte, 3-byte and 4-byte (MaximumWidth) encoding and determines which encoding uses the minimal number of bytes (MinimumSize) to encode the sequence of deltas.

For each encoding (1-byte, 2-byte, and so on), four parameters, Sequence, Buffer, TotalSize and Index, are provided. "Sequence" represents the sequence of deltas received, "Buffer" represents an output buffer for an encoding function (which will be discussed below), "TotalSize" represents the total number of bytes used to encode the sequence of deltas for each encoding, and "Index" is a tracked positional number for the sequence of deltas. At step 408, Sequence is set to equal to the sequence of deltas received, Buffer is set to equal to an output buffer of the encoding function, and TotalSize and Index are set to zero.

At step 410, it is determined whether the tracked positional number (Index) is smaller than the length of the sequence of deltas (length(Sequence)). If Index is smaller than length (Sequence), steps 412 and 414 are performed. If Index is not smaller than length(Sequence), which means there is no more element in the Sequence to be encoded, steps 416, 418, 420, 422, and 424 are performed.

If Index is smaller than the length of the sequence, an encoding function EncodeInteger (Buffer, Sequence[Index], Width)] is applied to determine a number of bytes (NumberBytes) used to encode the Index-th element in the sequence (Sequence[Index]) at step 412. The encoding function is described in detail in FIG. 5 below.

Figure 5:
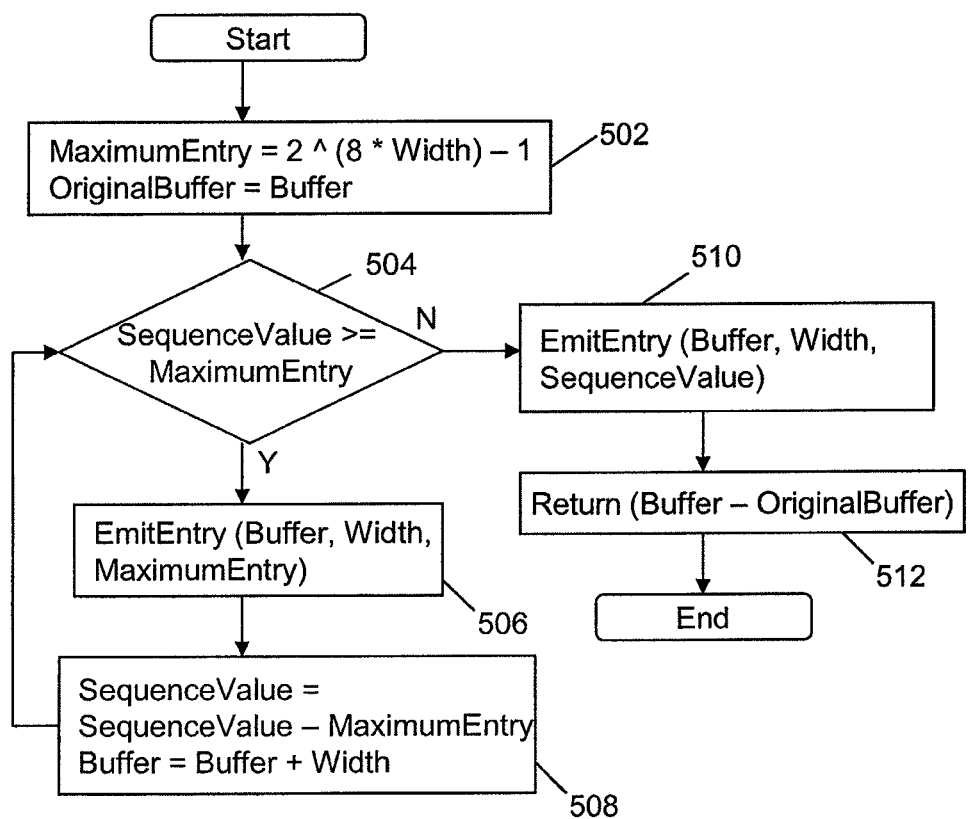
FIG. 5 is a flow diagram illustrating processes for an encoding function according to some embodiments.

FIG. 5 illustrates a flow diagram for an exemplary process 500 for implementing an encoding function having parameters, Buffer, SequenceValue=Sequence[Index] and Width to determine a number of bytes (NumberBytes) used to encode the Index-th element in the sequence of deltas.

At step 502, the maximum value (MaximumEntry) that will fit in the byte number (Width) is determined. Specifically, MaximumEntry=2^(8*Width)−1. Also, parameter (OriginalBuffer) is provided and set to equal to Buffer to preserve the original buffer output value.

At step 504, SequenceValue, which equals to the value of the Index-th element in the sequence (Sequence[Index]), is compared with the determined MaximumEntry. If SequenceValue is greater than or equal to the MaximumEntry, the function EmitEntry(Buffer, Width, MaximumEntry) is performed to take the value of MaximumEntry and write to Buffer up to the Width bytes from the integer representation of MaximumEntry at step 506. If SequenceValue is greater than or equal to the MaximumEntry, it is determined that SequenceValue is an overflowed value with respect to the MaximumEntry. In other words, SequenceValue is too large to be stored in the byte number, Width.

At step 508, SequenceValue is updated by subtracting MaximumEntry from SequenceValue, and the output buffer (Buffer) is updated by adding Width to Buffer. The process then proceeds back to step 504 to determine whether the updated SequenceValue is greater than or equal to MaximumEntry. If the updated SequenceValue is again greater than or equal to MaximumEntry, steps 506 and 508 are again performed. By repeating steps 504, 506 and 508, the overflowed SequenceValue are "split" into smaller parts such that each of the smaller parts is able to fit into the byte number, Width. In other words, the overflowed SequenceValue is encoded as multiple(s) of the value of MaximumEntry and a remainder value.

On the other hand, if SequenceValue is neither greater than nor equal to the MaximumEntry, the process proceeds to 510 to perform the function EmitEntry(Buffer, Width, SequenceValue) to take the value of SequenceValue and write to Buffer up to the byte number Width from the integer representation of SequenceValue. If SequenceValue is neither greater than nor equal to the MaximumEntry, then SequenceValue is able to be encoded in the byte number (Width). As a result, the encoding for the Index-th element is completed.

At step 512, a return function subtracts the original output buffer (OriginalBuffer) from the output buffer (Buffer) to return, as an output of the encoding function, the number of bytes used to encode the Index-th element.

Referring back to FIG. 4, once the number of bytes (NumberBytes) is determined at step 412, the TotalSize is updated by adding the TotalSize and the determined NumberBytes at step 414, and Index is incremented by one. Next, the process proceeds back to step 410 to determine whether there is a next element in the sequence by comparing Index with the length of the Sequence. As a result, steps 412 and 414 are performed for every delta in the sequence.

If the Index is not smaller than the length of the sequence, the process proceeds to step 416 to determine whether the total number of bytes used to encode the sequence of deltas (TotalSize) is smaller than the minimal number of bytes used to encode the sequence of deltas (MinimumSize) thus far. If TotalSize is smaller than MinimumSize, then TotalSize now represents the minimal number of bytes used to encode the sequence of deltas. As such, MinimumSize is set equal to the TotalSize at step 418. At step 420, Width is incremented by one.

On the other hand, if TotalSize is not smaller than MinimumSize, the process then proceeds directly to step 420 to increment Width without updating MinimumSize.

By comparing TotalSize determined for each encoding (1-byte, 2-byte, and so on) with the MinimumSize, and setting MinimumSize to equal to TotalSize when TotalSize is smaller than MinimumSize, the final value for MinimumSize would be associated with the encoding using the minimum size of bytes.

At step 422, it is determined whether Width is smaller than MaxiumumWidth. If the Width is smaller than the Max_byte, the process goes back to step 408 to repeat steps 408 to 422 for the next encoding using the updated Width.

On the other hand, if Width is not smaller than MaximumSize, the process proceeds to step 424 to output the encoding associated with the minimal number of bytes used (MinimumSize).

Figure 6:
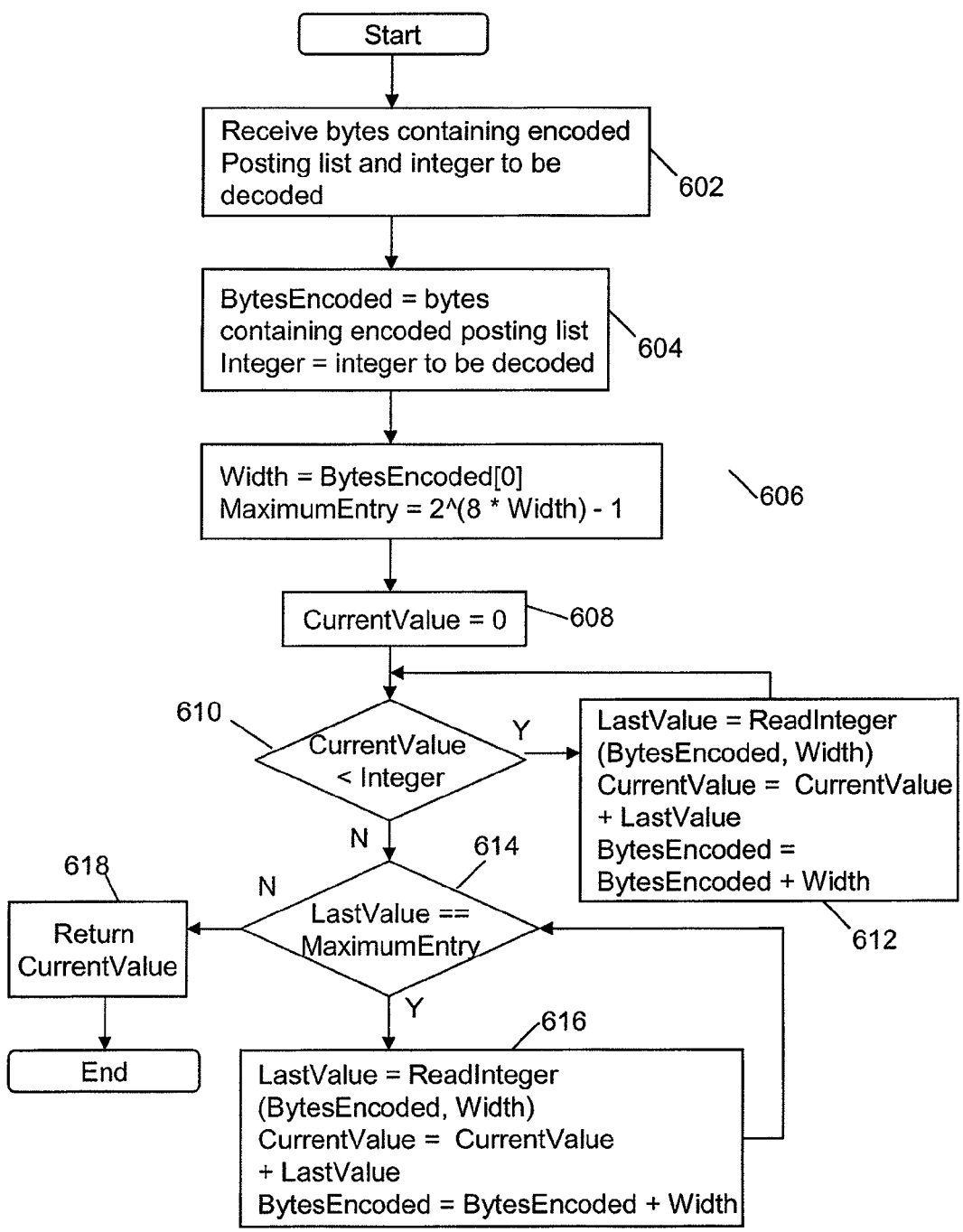
FIG. 6 is a flow diagram illustrating processes for a decoder according to some embodiments.

FIG. 6 illustrates a flow diagram for an exemplary process 600 for decoding an encoded posting list. The decoder engine 110, in some embodiments, implements the process 600 utilizing the decoder database 113. As discussed above, an encoded posting list is often decoded in order to assess a particular element in the list. Furthermore, because the posting list is delta encoded, assessing a particular element is basically adding up all the deltas in between a current position and the position of the particular element.

At step 602, the decoder engine 110 receives bytes containing an encoded posting list and an integer to be decoded from the search engine 108 or other servers (not shown).

At step 604, two parameters BytesEncoded and Integer are provided. BytesEncoded is set to equal the bytes containing the encoded posting list and Integer is set to equal to the integer to be decoded.

As discussed above, because the byte number used to encode each element in a posting list is known, there is no need to look up the byte number for each element in the posting list in a decoding process. Instead, the byte number is stored in the first byte of the bytes (BytesEncoded) containing the encoded posting list. At step 606, the byte number is assigned to Width (Width=BytesEncoded[0]). Also, the maximum value (MaximumEntry) that will fit in the byte number (Width) is determined. Specifically, MaximumEntry=$2^{(8*Width)}-1$.

At step 608, CurrentValue is provided and initialized to zero. CurrentValue represents a sum of the decoded deltas.

At step 610, it is determined whether the sum of the decoded deltas (CurrentValue) is smaller than the integer to be decoded (Integer). If CurrentValue is smaller than the integer to be decoded, a function, ReadInteger(BytesEncoded, Width), is performed to read out the next delta (or Width bytes as integer representation) and assign the readout delta to LastValue at step 612. CurrentValue is updated by adding the readout delta (LastValue) to the CurrentValue. Also, the bytes containing the encoded posting list (BytesEncoded) is advanced to a next delta by incrementing the bytes containing the encoded posting list (BytesEncoded) by Width.

On the other hand, if CurrentValue is not smaller than the integer to be decoded, it is determined whether the readout delta (LastValue) is equal to the maximum number (MaximumEntry) at step 614. If the readout delta is equal to the maximum number, the process proceeds to step 616, which performs the same as at step 612. Specifically, the function, ReadInteger(BytesEncoded, Width), is performed to read out the next encoded delta and assign the readout delta to LastValue. CurrentValue is updated by adding the readout delta (LastValue) to CurrentValue. Also, the bytes containing the encoded posting list (BytesEncoded) is advanced to a next delta by incrementing the bytes containing the encoded posting list (BytesEncoded) by Width.

If the readout delta is not equal to the maximum number, the process proceeds to step 618 to return as an output the sum of the decoded deltas (CurrentValue).

Figure 7:
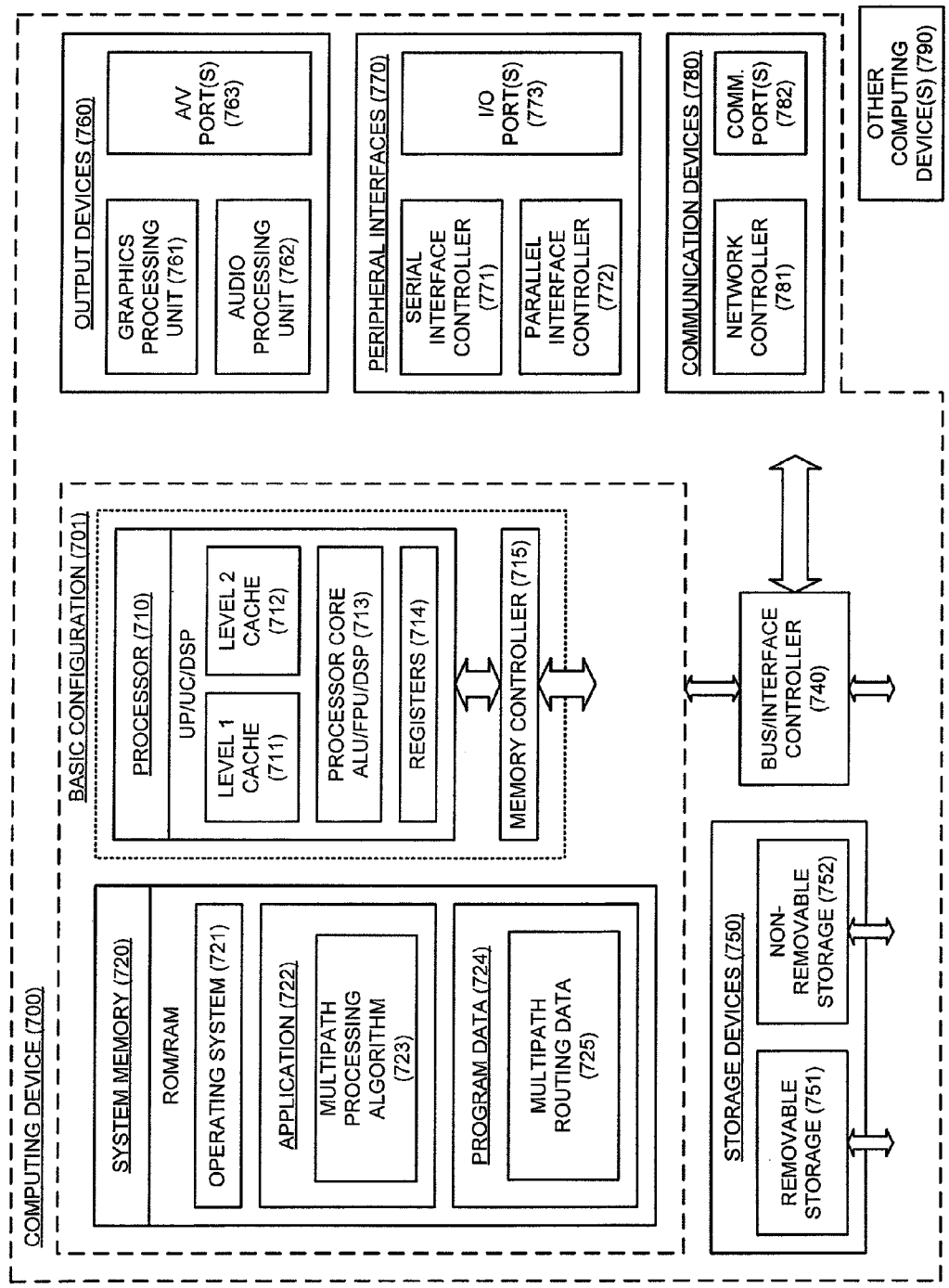
FIG. 7 is a block diagram illustrating an example computing device arranged for fixed width encoding according to some embodiments.

FIG. 7 is a block diagram illustrating an example computing device 700 that is arranged for fixed width encoding/decoding in accordance with the present disclosure. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes encoding/decoding algorithm 723 that is arranged to perform a fixed width encoding/decoding. Program Data 724 includes encoding/decoding data 725 that is useful for performing a fixed width encoding/decoding, as will be further described below. In some embodiments, application 722 can be arranged to operate with program data 724 on an operating system 721 such that a fixed width encoding/decoding is performed. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which can be arranged to facilitate communications with one or more other computing devices 790 over a network communication via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
   a server that includes a processor configured to execute instructions for obtaining a sequential list of document identification numbers, each of the document identification numbers uniquely identifying a document; and
   an encoding device operatively connected to said server, said encoding device generating, through operation of a processor executing instructions stored on a memory device, a sequence of deltas from the sequential list of the document identification numbers, and for each delta in the sequence of deltas, determining if the delta is greater than or equal to a first maximum value of a first predetermined byte number, and for each of the deltas greater than or equal to the first maximum value, recalculating the delta as one or more multiples of the first maximum value and a remainder value,
   said encoding device determining a first total number of bytes for encoding the sequence of deltas based on the first predetermined byte number.

2. The apparatus according to claim 1, wherein the encoding device, for each delta in the sequence of deltas, determines if the delta is greater than or equal to a second maximum value of a second predetermined byte number, and wherein the encoding device, for each of the deltas that is greater than or equal to the second maximum value, recalculates the delta as one or more multiples of the second maximum value and a remainder value, said encoding device determining a second total number of bytes for encoding the sequence of deltas based on the second predetermined byte number.

3. The apparatus according to claim 2, wherein the encoding device compares the first total number of bytes and the second total number of bytes, and encodes the sequence of deltas using the first predetermined byte number if the first total number of bytes is smaller than the second total number of bytes and encodes the sequence of deltas using the second predetermined byte number if the first total number of bytes is greater than or equal to the second total number of bytes.

4. The apparatus according to claim 2, wherein the first predetermined byte number is 1 and the second predetermined byte number is 2.

5. The apparatus according to claim 1, wherein said server receives a search request and one or more keywords, and
obtains the sequential list of the document identification numbers based on the received search request and the one or more keywords.

6. A computer-implemented method comprising:
obtaining, through operation of a processor executing instructions stored on a memory device, a sequential list of document identification numbers, each of the document identification numbers uniquely identifying a document;
generating a sequence of deltas based on the sequential list of the document identification numbers;
for each delta in the sequence of deltas, determining if the delta is greater than or equal to a first maximum value of a first predetermined byte number, and
for each of the deltas greater than or equal to the first maximum value,
recalculating the
delta as one or more multiples of the first maximum value and a remainder value; and
determining a first total number of bytes for encoding the sequence of deltas based on the first predetermined byte number.

7. The computer-implemented method of claim 6, further comprising:
for each delta in the sequence of deltas, determining if the delta is greater than or equal to a second maximum value of a second predetermined byte number,
for each of the deltas greater than or equal to the second maximum value,
recalculating
the delta as one or more multiples of the second maximum value and a remainder value; and
determining a second total number of bytes for encoding the sequence of deltas based on the second predetermined byte number.

8. The computer-implemented method of claim 7, further comprising:
comparing the first total number of bytes and the second total number of bytes;
encoding the sequence of deltas using the first predetermined byte number if the first total number of bytes is smaller than the second total number of bytes; and
encoding the sequence of deltas using the second predetermined byte number if the first total number of bytes is greater than or equal to the second total number of bytes.

9. The computer-implemented method of claim 7, wherein the first predetermined byte number is 1 and the second predetermined byte number is 2.

10. The computer-implemented method of claim 6, further comprising:
receiving a search request and one or more keywords, and
obtaining the sequential list of the document identification numbers based on the received search request and the one or more keywords.

11. A non-transitory computer-readable medium having computer-executable instructions, which, when executed by a computer having one or more processors, cause the computer to perform steps of:
obtaining a sequential list of document identification numbers, each of the document identification numbers uniquely identifying a document;
generating a sequence of deltas based on the sequential list of the document identification numbers;
for each delta in the sequence of deltas, determining if the delta is greater than or equal to a first maximum value of a first predetermined byte number, and
for each of the deltas that is greater than or equal to the first maximum value, recalculating the delta as one or more multiples of the first maximum value and a remainder value; and
determining a first total number of bytes for encoding the sequence of deltas based on the first predetermined byte number.

12. The non-transitory computer-readable medium of claim 11, said computer-executable instructions, which, when executed by the computer, cause the computer to perform additional step of:
for each delta in the sequence of deltas: determining if the delta is greater than or equal to a second maximum value of a second predetermined byte number,
for each of the deltas that is greater than or equal to the second maximum value, recalculating the delta as one or more multiples of the second maximum value and a remainder value; and
determining a second total number of bytes for encoding the sequence of deltas based on the second predetermined byte number.

13. The non-transitory computer-readable medium of claim 12, said computer-executable instructions, which, when executed by the computer, cause the computer to perform additional steps of:
comparing the first total number of bytes and the second total number of bytes;
encoding the sequence of deltas using a first predetermined byte number if the first total number of bytes is smaller than the second total number of bytes; and
encoding the sequence of deltas using the second predetermined byte number if the first total number of bytes is greater than or equal to the second total number of bytes.

14. The non-transitory computer-readable medium of claim 12, wherein the first predetermined byte number is 1 and the second predetermined byte number is 2.

15. The non-transitory computer-readable medium of claim 11, said computer-executable instructions, which, when executed by the computer, cause the computer to perform additional steps of:
receiving a search request and one or more keywords, and
obtaining the sequential list of the document identification numbers based on the received search request and the one or more keywords.

* * * * *